United States Patent
Jagos et al.

(10) Patent No.: US 8,545,662 B2
(45) Date of Patent: Oct. 1, 2013

(54) SWING OUT MOLD INSERT DEVICE ON LAY UP MOLDS

(75) Inventors: Paul D. Jagos, Midland (CA); Curtis Spencer Quesnelle, Midland (CA); Thomas Schmitz, Penetanguishene (CA)

(73) Assignee: Weber Manufacturing Technologies Inc., Midland, Ontario (CA)

( * ) Notice: Subject to any disclaimer, the term of this patent is extended or adjusted under 35 U.S.C. 154(b) by 24 days.

(21) Appl. No.: 13/546,283

(22) Filed: Jul. 11, 2012

(65) Prior Publication Data

US 2013/0014887 A1  Jan. 17, 2013

Related U.S. Application Data

(60) Provisional application No. 61/457,927, filed on Jul. 11, 2011.

(51) Int. Cl.
  *B29C 70/46*  (2006.01)
(52) U.S. Cl.
  USPC .......................................... 156/245; 156/536
(58) Field of Classification Search
  USPC ....................................................... 156/245
  See application file for complete search history.

(56) References Cited

U.S. PATENT DOCUMENTS

| | | |
|---|---|---|
| 2,784,455 A | 3/1957 | Pulaski |
| 3,302,245 A | 2/1967 | Scott |
| 3,666,600 A | 5/1972 | Yoshino |
| 4,030,871 A | 6/1977 | Cobb |
| 4,101,256 A | 7/1978 | White |
| 4,562,033 A | 12/1985 | Johnson |
| 4,681,651 A | 7/1987 | Brozovic |
| 4,915,896 A | 4/1990 | Rachal |
| 5,106,568 A | 4/1992 | Honka |
| 5,152,949 A | 10/1992 | Leoni |
| 2008/0237930 A1 | 10/2008 | Evans |
| 2008/0241296 A1 | 10/2008 | Wang |
| 2009/0214874 A1 | 8/2009 | Voss |
| 2011/0062628 A1 | 3/2011 | Iobst |

FOREIGN PATENT DOCUMENTS

JP  07223258 A  *  8/1995

OTHER PUBLICATIONS

U.S. Appl. No. 13/545,338, filed Jul. 2012, Jagos, Paul et. al.*

* cited by examiner

Primary Examiner — Philip Tucker
Assistant Examiner — Vicki Wu
(74) Attorney, Agent, or Firm — Riches, McKenzie & Herbert LLP

(57) ABSTRACT

An apparatus and method in which an insert with an undercut is mechanically coupled to a lay up mold for translated movement between an engaged position for molding with an undercut engaging the material to be molded and a remote position in which a resultant molded product maybe removed and the material may be laid up without interference with the undercut, preferably with the mechanical coupling allowing for hinged movement of the insert relative the lay up mold.

20 Claims, 7 Drawing Sheets

SWING OUT MOLD INSERT DEVICE ON LAY UP MOLDS

RELATED APPLICATION

This application claims the benefit under 35 U.S.C. 119(e) to U.S. provisional patent application Ser. No. 61/457,927 filed Jul. 11, 2011.

SCOPE OF THE INVENTION

This invention relates to lay in molding, particularly thermoplastic and thermoset molding and, more particularly, to an apparatus and method for improving mold preparation and demolding for quicker cycle times.

BACKGROUND OF THE INVENTION

It is well known to produce metal molds such as steel, composite or nickel shells that are built into molds for lay up and curing of composite materials. For example, reference is made to U.S. Pat. No. 3,666,600 to Yoshino issued May 30, 1972; U.S. Pat. No. 4,562,033 to Johnson et al issued Dec. 31, 1985 and U.S. Pat. No. 5,106,568 to Honka issued Apr. 21, 1992.

US Patent Publication 2009/0214874 Voss et al. published Aug. 27, 2009, the disclosure of which is incorporated herein by reference, teaches the manufacture of molded fiber composite panels for an automobile such as panels useful for fascia engine hoods, front quarter panels, doors, rear quarter panels, rear trunk decks, pillars, roofs rocker panels, interior trims, exterior trims, spoilers, door handles, mirror covers, air diffusers, and fascia extensions. Voss et al teaches that a such panels may be made by a first method involving autoclave molding of a hand lay up of fiber-epoxy prepreg using a single-sided metal or composite tool. The panels may be produced by first cutting the prepregs to the shape of the part using an automated pattern-cutting machine. A predetermined number of plies of the patterned prepregs may be manually laid up in the tool cavity, and covered and sealed with a silicone rubber vacuum bag to evacuate the air trapped between the plies. The assembled prepreg plies may be subsequently consolidated and cured in an autoclave at an elevated temperature under pressure for a given period of time. The autoclave then may be cooled down and depressurized for the cured prepregs to be removed from the single-sided tool. The cured prepregs are trimmed, inspected, and finished to produce the final composite panels. Another second method of making composite panels involves resin transfer molding of fiber performs in a matched-metal or composite tool. The fiber preforms can be made by heating and pressuring patterned lay ups prepared from continuous random fiber mats, unidirectional fiber tapes, or woven fiber fabrics. The fiber preforms can also be made by lay up molding by directly spraying chopped fibers onto a preform mold or by depositing chopped fibers onto a perform mold using a water or liquid slurry process. The shaped fiber preforms may be placed in the matched-metal or composite tool and the epoxy resins are subsequently injected into the closed tool cavity. The tool may be kept at an elevated temperature under pressure for a given period of time to impregnate the fibers with epoxy resins and to form the cured composite panels.

As disclosed by Voss et al, a typical automotive fiber-epoxy prepreg material which may be utilized according to one exemplary embodiment is the P831-190 carbon fiber-epoxy prepreg produced by Toray Composites. The prepreg is made with Toray's T-600 24 k unidirectional carbon fiber (60 wt %) and G83C epoxy resin (40 wt %). Similar commercial prepreg materials, in both unidirectional tape and woven fabric forms, are available from prepreg suppliers such as Advanced Composites Group (ACG) and Hankuk Carbon Company using carbon fibers produced by Toray, TohoTenax, Zoltek, etc. The prepregs can be cured at 150° C. (peak temperature) under 0.7 MPa pressure for 10 minutes. A full cycle of the autoclave molding takes approximately 90 minutes to complete. The molding cycle consists of loading, pressurizing, ramping up to 150° C., cooling down, depressurizing, unloading and demoulding.

Where a resultant product is desired to have trapped portions such as under cuts, it is known to provide the mold with removable tool inserts that are manually placed on the mold in dedicated positions and locked into position. Composite material is laid up under the trapped geometry formed by the insert. After material curing, the insert is manually removed from the mold to permit removal of the cured rigid resultant product with the molded trapped geometry. Securely locking the inserts into position prevents movement and minimizes witness lines.

Known loose inserts for lay up molds suffer disadvantages that are handled manually and must always be handled carefully to prevent misalignment. The applicants have appreciated that the dropping of loose inserts has the severe disadvantage of resulting in damaged inserts or more significant damage to the mold face. Manual handling has the disadvantages of requiring dexterity, skill and time.

After molding, the resin of the cured product freezes the insert in place as by adhering to surfaces of the insert, and significant force is normally needed to disengage the insert from the product. Such adherence may be overcome by manual prying as with use of a prying bar, however, such lifting of the insert having the disadvantage of requiring careful handling to avoid damaging the insert or having the insert when released strike the mold.

Manual handling of the inserts has been appreciated by the applicants as having the disadvantage of requiring a significant cycle time for the molding process, and a need for significant skill level for the operators, which need increases as production volumes and applications increase.

SUMMARY OF THE INVENTION

To at least partially overcome these disadvantages of previously known devices, the present invention provides an apparatus and method in which an insert is mechanically coupled to a lay up mold for translated movement between an engaged position for molding and a remote position in which the resultant product maybe removed and the material may be laid up, preferably with the mechanical coupling allowing for hinged movement of insert relative to the lay up mold.

Preferably, locating surfaces are provided on the mold and complementary locating surfaces are provided on the insert so as to precisely locate the insert in the engaged position for molding, and as well to guide the insert as it moves from the remote position to the engaged position at least during movement immediately prior to the insert reaching the engaged position.

Where the mold is one for vacuum bagging with a perimeter of the mold adapted for sealed engagement with a vacuum bag, the mechanism is preferably provided to be out of the way for the vacuum bagging requirements, as preferably by being in the engaged position flush with or recessed below a surface of the perimeter of the mold which sealably connects the vacuum bag. Having, for example, a mechanical hinge mechanism that is flush with the perimeter of the mold allows the hinge mechanism to be out of the way for the vacuum bagging requirements on the perimeter of the mold. The coupling mechanism is preferably selected such that it does not reduce the molds capability to maintain vacuum integrity.

Advantageously, a mold having a hinge mechanism on each insert, for example, a swing out hinge, can be demolded quickly by allowing the insert to be swung away from the mold from the engaged position to the remote position to release the trapped, undercut areas of the resultant molded product quickly. The hinge mechanism provides a mechanical connection of the insert to the mold that prevents insert from engaging the mold other than where intended, thus preventing the insert from inadvertently being dropped on to other portions of the mold, damaged or misplaced.

The hinge mechanism advantageously may be manually moved between the engaged position and the remote position more quickly with out the risk of mishandling. The hinge mechanism allows for the implementation of automation to assist in movement of the insert between the engaged position and the remote position as in preparation and remolding and to further improve cycle times.

The hinge mechanism provides for the integration of the inserts to the mold which produces a number of advantages. As one advantage the time required to clean and prepare the insert is reduced since the insert does not need to be placed, stored or handled on a separate worksurface. Operating and maintenance costs are reduced as a result.

In a first aspect, the present invention provides method of lay up molding comprising:

providing a lay up mold with a movable insert which is mechanically coupled to the mold for movement between (a) in an engaged position in which the insert is secured to the mold and provides an undercut surface, and (b) a remote position remote from the engaged position, the method including a cycle of operation with the steps of:
moving the insert to the engaged position,
laying sheet material into the lay up mold in engagement with the undercut surface,
with the insert in the engaged position molding the sheet material in the mold to form the sheet material into a resultant product which is in engagement with the undercut surface,
moving the insert relative the mold from the engaged position to the remote position wherein in the remote position the insert is clear from the resultant product and the resultant product is capable of being removed from the mold without contacting the insert, and
with the insert in the remote position removing the resultant product from the mold.

In a second aspect, the present invention provides a lay up mold assembly comprising:

a lay up mold with a movable insert which is mechanically coupled to the mold for movement between (a) in an engaged position in which the insert is secured to the mold and provides an undercut surface, and (b) a remote position remote from the engaged position, with the insert in the engaged position, the mold providing a cavity to receive lay up material in the mold to be formed into a resultant product which material is in engagement with the undercut surface, with the insert in the remote position, the insert is clear from the resultant product such that the resultant product can be removed from the mold without contacting the insert.

BRIEF DESCRIPTION OF THE DRAWINGS

Further aspects and advantages of the present invention will become apparent from the following description taken together with the accompanying drawings in which.

DETAILED DESCRIPTION OF THE DRAWINGS

Figure 1:
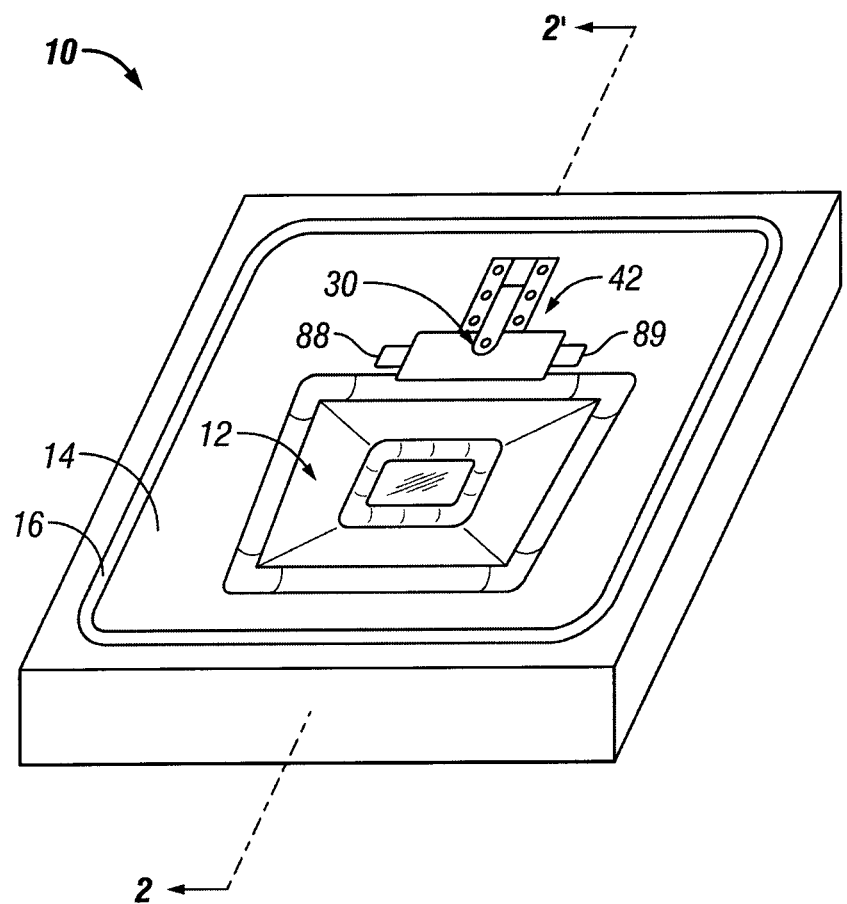
FIG. 1 is a pictorial view of a lay up mold in accordance with a first embodiment of the present invention.
Figure 2:
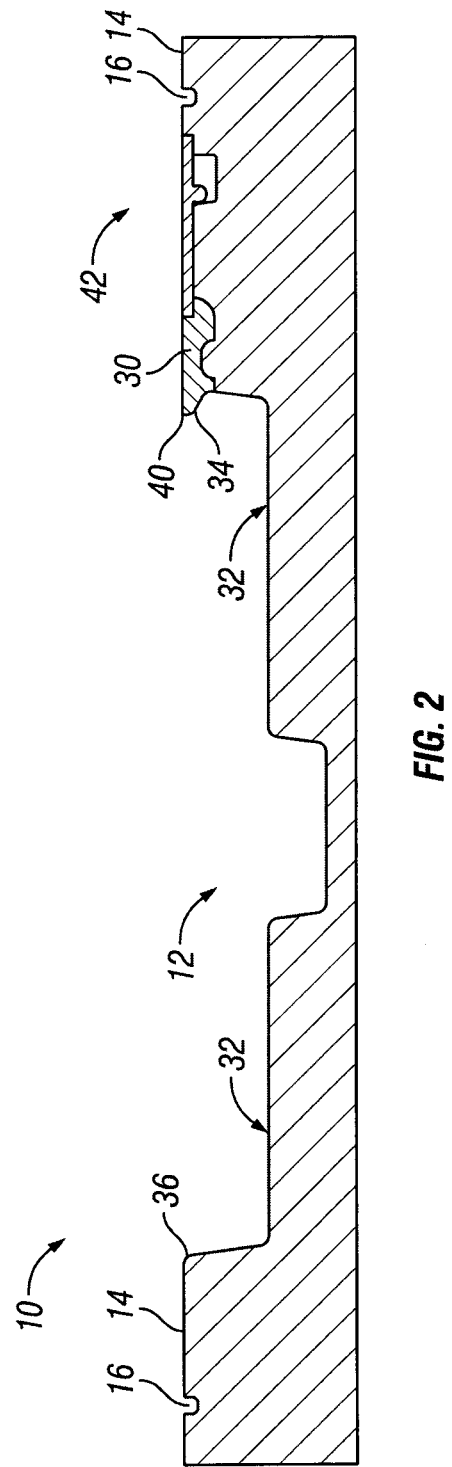
FIG. 2 is a cross-sectional side view of the mold of FIG. 1 along section line 2-2' with the insert in an engaged position.

Reference is made to FIG. 1 which illustrates a lay up mold 10 in accordance with the present invention. The mold 10 defines a mold cavity 12 as seen, for example, in FIGS. 1 and 2 as being a cavity which extends downwardly from a perimeter surface 14 of the mold. The perimeter surface 14 is shown as being flat and disposed in a common plane for ease of illustration. A perimeter sealing groove 16 extends circumferentially about the perimeter surface 14.

Figure 4:
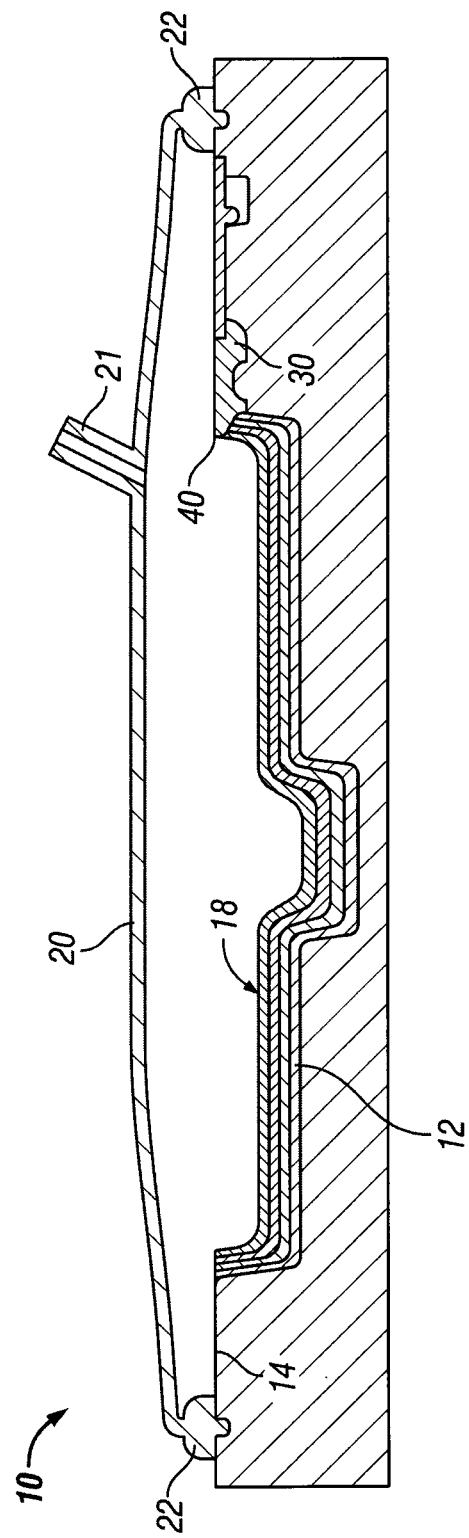
FIG. 4 is a cross-sectional side view similar to FIG. 3, however, showing a prepreg inserted into the lay up mold and with a vacuum bag sealed to the outer edges of the lay up mold.

Reference is made to FIG. 4 which illustrates prepregs 18 after they have been laid into the mold cavity and a flexible impermeable vacuum bag 20 applied over the mold 10 so as to enclose the mold cavity with a perimeter edge 22 of the vacuum bag 20 sealed to the groove 16 circumferentially about the perimeter surface 14 in a known manner as with a suitable sealant material. The vacuum bag 20 is schematically illustrated as carrying a nipple 21 via which the volume which is enclosed between the lay up mold 10 and the vacuum bag 20 may be evacuated as by a vacuum pump (not shown). In a known manner and via various different processes, the temperature within the vacuum bag assembly 20 comprising the mold 10 and the vacuum bag 20 is increased and maintained so that resin in the prepregs 18 out-gases and becomes mobile for the prepregs 18 to coalesce and conform to the shape of the mold cavity 12. The resin subsequently gels and the temperature within the vacuum assembly 24 is further increased to cure the resin in the prepregs. In alternate embodiments, heating and pressurizing can be carried out by any suitable means such as an oven, hotplate, compression tool, hydroclave and/or internal heating elements within the mold 10. Finally, the temperature of the vacuum bag assembly 24 is decreased and the vacuum bag assembly 24 is dismantled towards removal of the molded resultant composite product.

As is known, in some processes, after the prepregs are laid into the mold and before the vacuum bag 20 is applied, the prepregs may be overlaid with porous and non-porous relief sheets and breather materials which assist in any required out-gassing as the resin is heated and cured. The temperature and pressure within the vacuum bag assembly 24 may be increased by different arrangements. In one known arrangement, the vacuum bag assembly 24 is placed in an autoclave, not shown. In another arrangement, heating and pressurizing the prepreg is carried out without an autoclave, in an out of autoclave process. The heating and pressurizing can be carried out by any suitable process and apparatus such as those including an oven, hotplate, compression tool, hydroclave and internal heating within the mold 10.

Figure 3:
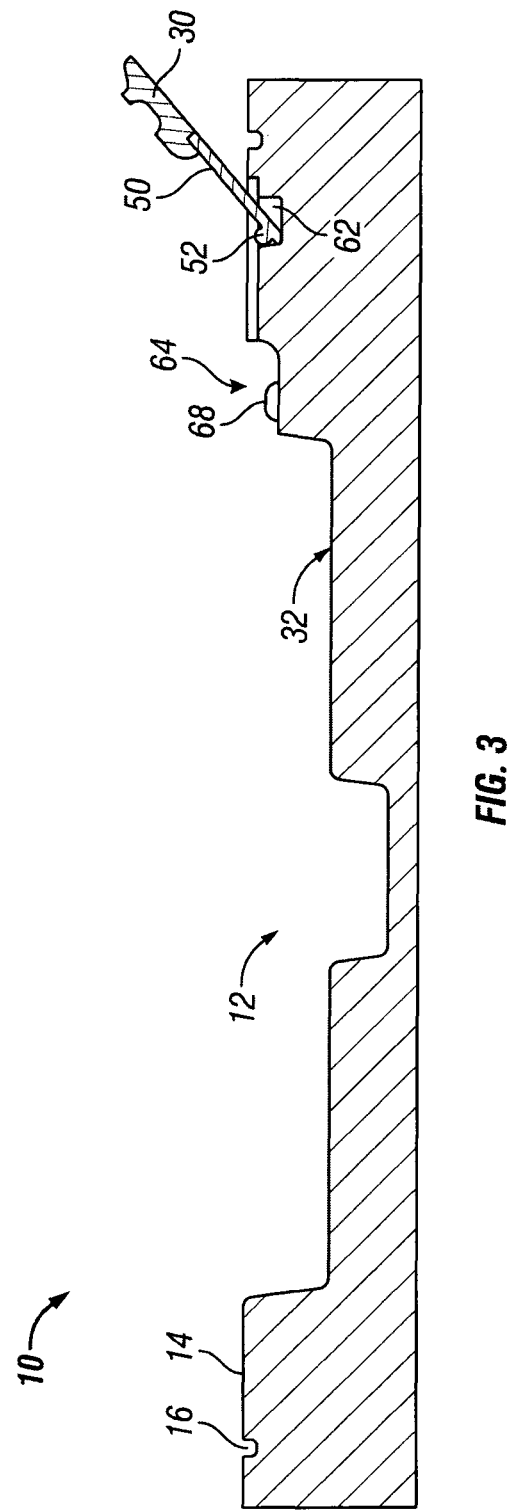
FIG. 3 is a cross-sectional view the same as in FIG. 2 but with the insert in a remote position.
Figure 5:
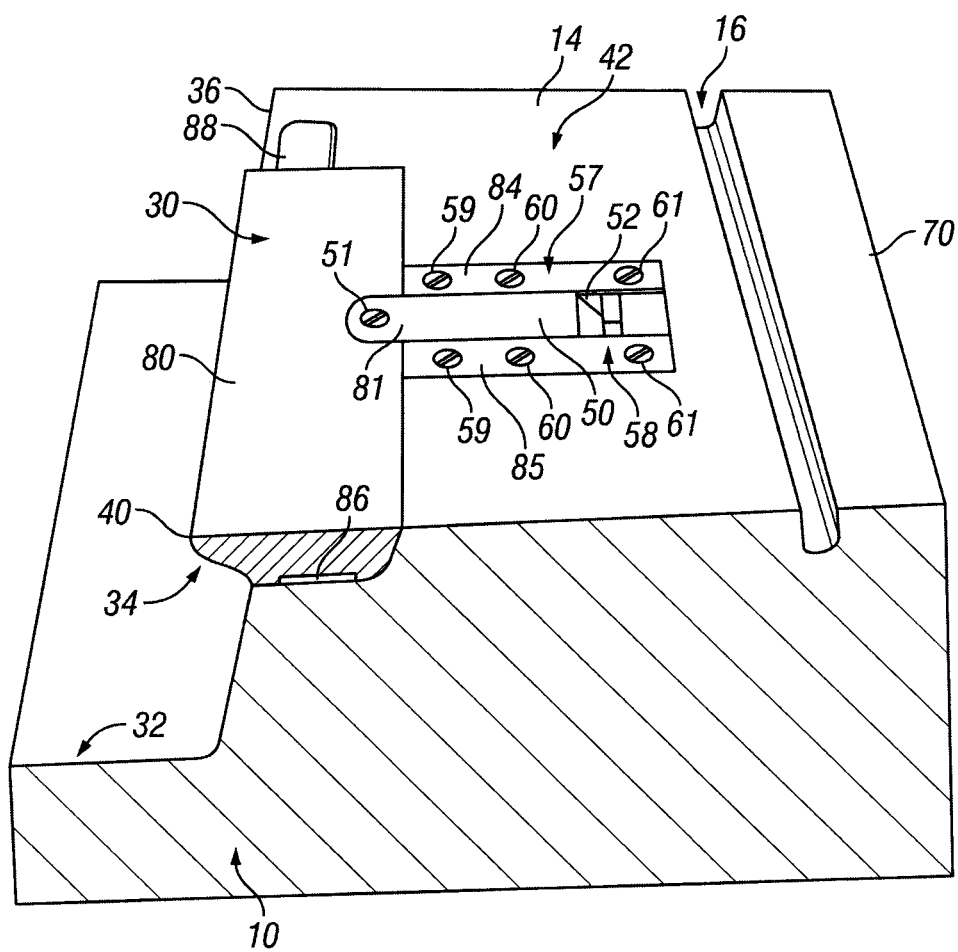
FIG. 5 is a schematic partially cross-section pictorial view of a segment of the lay up mold of FIG. 1 showing the insert in the engaged position.
Figure 6:
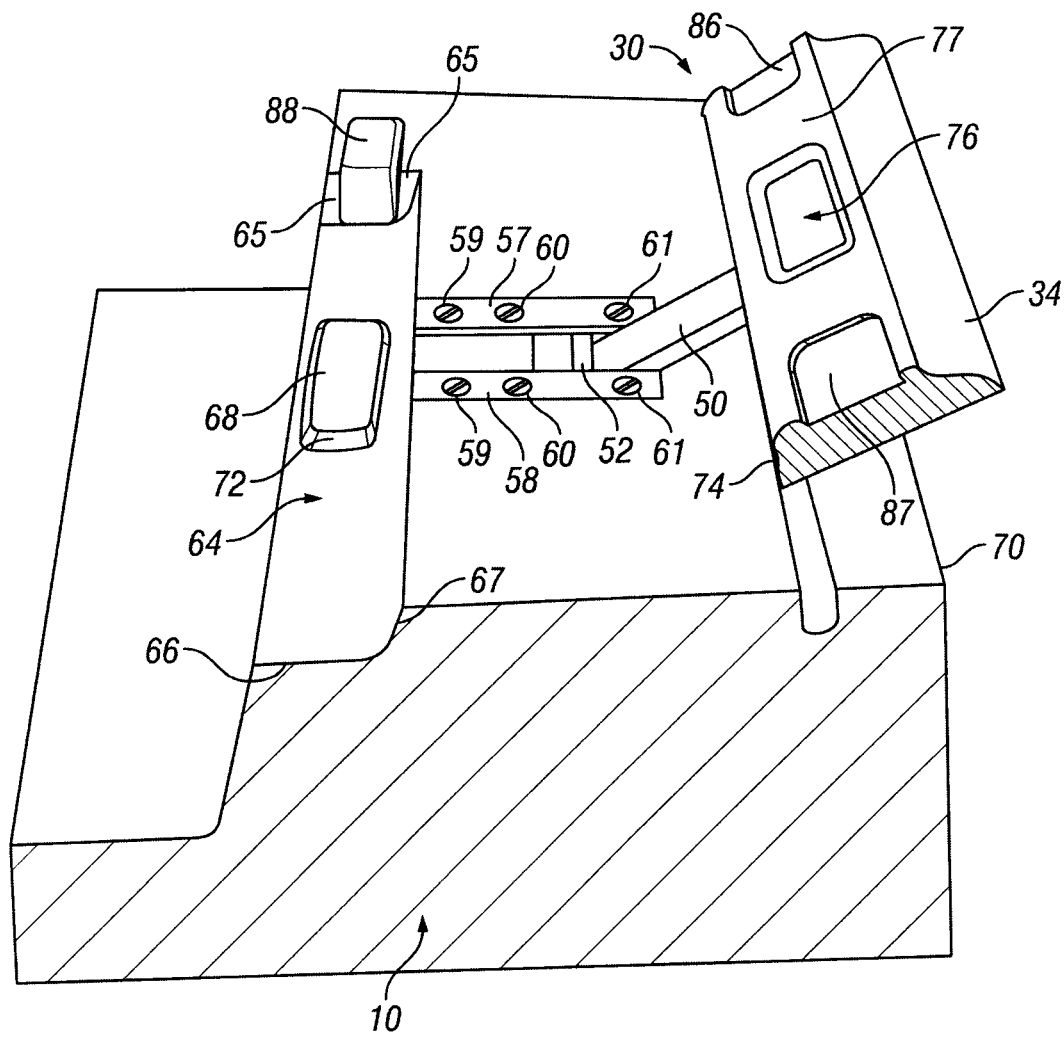
FIG. 6 is a schematic view substantially the same as that shown in FIG. 5, however, with the insert in a remote position as illustrated in FIG. 2.

As can be seen in each of the Figures, the mold 10 includes an insert 30 which is adapted for movement between an engaged position as shown in FIGS. 1, 2, 4 and 5 and a remote position as shown in FIGS. 3 and 6. The mold cavity 12 has a cavity molding surface 32 and the insert 30 has an insert molding surface 34. Other than where the insert 30 is located, the cavity molding surface 32 intersects with the perimeter surface 14 at a cavity edge 36 open upwardly, that is, without any undercut such that after molding a rigid resultant product may move vertically upwardly from the mold cavity 12 past the cavity edge 36. The insert 30 has an insert edge 40 which protrudes inwardly to overlie the insert molding surface 34 providing for an undercut underneath and inwardly of the insert edge 40 and which insert edge 40 and insert molding surface 34 with the insert 30 in the engaged position as shown, for example, in FIG. 4 prevent the vertical upward movement of the prepregs 18 and after molding the rigid resultant product.

Figure 7:
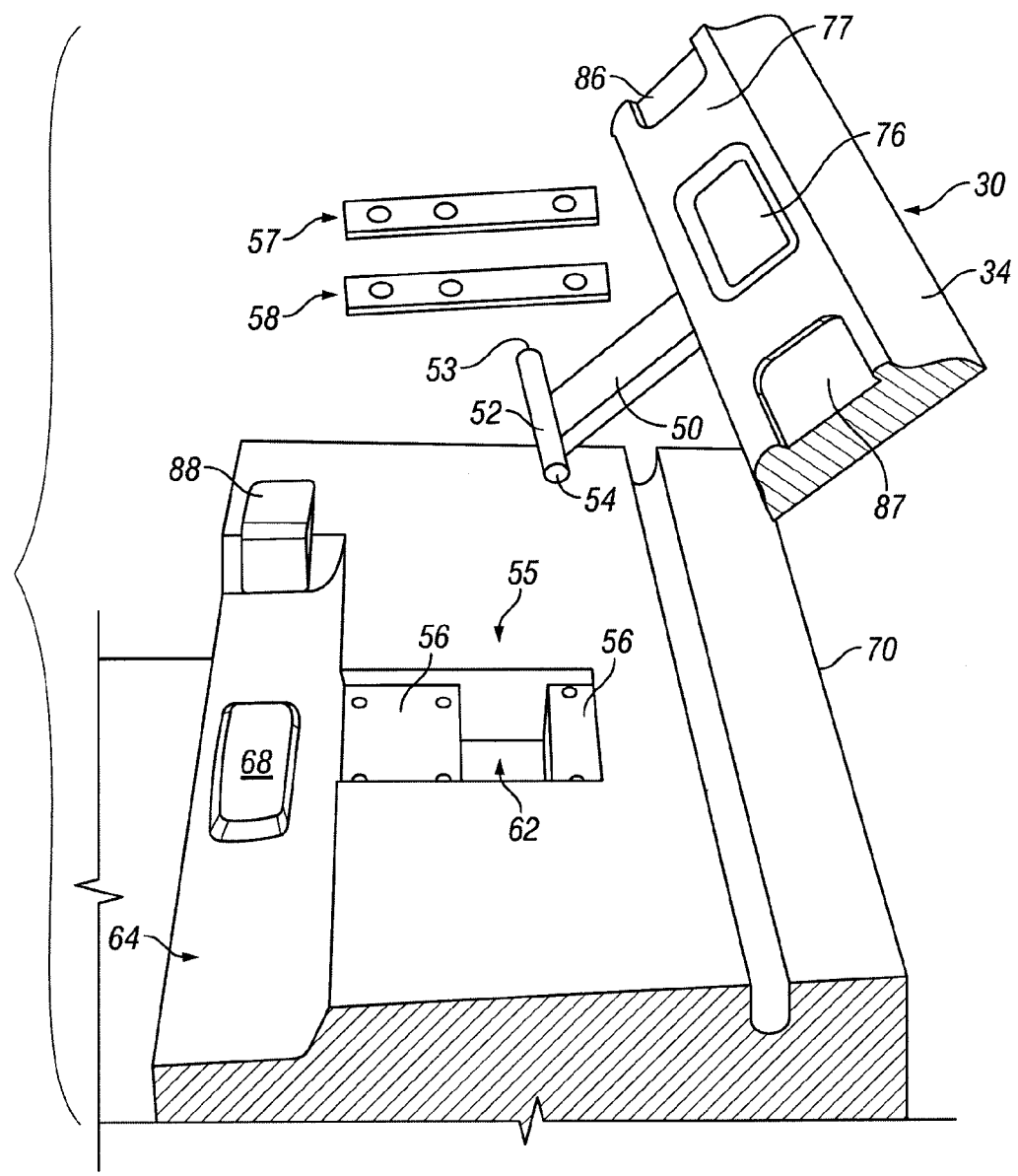
FIG. 7 is a schematic exploded pictorial view of components of the hinged mechanical coupling mechanism shown in FIG. 6.

The insert 30 is mechanically coupled to the mold 10 for movement between the engaged position in which the insert provides an undercut surface and the remote position remote from the engaged position. A mechanical coupling mechanism 42 shown to couple the insert 30 to the mold 10 utilizes a hinged arrangement. As seen in FIGS. 5 to 7, a flat hinge arm 50 is secured at one end via a screw 51 to the insert 30 and the hinge arm 50 carries a hinge pin 52 at its other end with the hinge pin 52 extending laterally to distal ends 53 and 54 past the hinge arm 50. As seen in FIG. 7, the hinge arm 50 extends in a first direction away from the insert 30 to the hinge pin 52 and the hinge pin 52 extends normal to this first direction. The perimeter surface 14 of the mold 10 has a cut out portion 55 cut therefrom which provides ledges 56 to receive two parallel locking bars 57 and 58 on either side of the hinge arm 50. Each lock bar 57 and 58 are secured to ledges 56 via screws indicated as 59, 60 and 61.

The cut out portion 55 includes a hinge pin recess 62 between the ledges 56 which hinge pin recess 62 extends laterally underneath the lock bars 57 and 58 between the outermost two screws 60 and 61. With the hinge arm 50 disposed parallel to and in between the two lock bars 57 and 58 and the distal ends 53 and 54 of the hinge pin 52 disposed in the hinge pin recess 62 underneath the lock bars 57 and 58, the insert 30 may be moved between the engaged position and the remote position by relative pivoting of the hinge arm 50 and its hinge pin 52 within the hinge pin recess 62. The hinge mechanism with the hinge pin 52 in the hinge pin recess 62 pivots about the hinge pin 52 to pivot the insert 30 to the remote position as seen in FIGS. 3 and 6 in which the insert 30 is spaced laterally outwardly from the cavity edge 36 of the mold cavity 12. As can be seen in comparing FIG. 2 to FIG. 3 and FIG. 5 to FIG. 6, the hinge mechanism couples the insert 30 to the mold 10 for pivotal movement from the engaged position of FIGS. 2 and 5 in which the insert 30 is overlies the mold cavity 12 toward the remote position in an arc initially moving the insert 30 upwardly away from the mold cavity 12 and laterally away from the mold cavity 12, and subsequently moving the insert 30 downwardly toward the perimeter surface 14 to the remote position in which the insert 30 is spaced laterally from the mold cavity 12. As well as is seen the hinge mechanism couples the insert 30 to the mold 10 for pivotal movement from the remote position seen in FIGS. 3 and 6 toward the engaged position of FIGS. 2 and 5 in an arc moving the insert 30 downwardly toward the mold cavity 12 as the insert 30 approaches the engaged position shown in FIGS. 2 and 5.

In the preferred embodiment, the hinge pin 52 is not closely journalled within the hinge pin recess 62 but rather is provided with an ability to move towards and away from an edge 70 of the mold 10 as is believed to be of assistance in permitting the insert 30 to locate itself relative to complementary locating surfaces provided on the mold 10. In this regard, as best seen in FIGS. 5 and 6, the mold 10 is provided with a socket 64 defined between opposite end surfaces 65, a bottom locating surface 66 and a side locating surface 67. As seen in FIGS. 3 and 6, the socket 64 is a downwardly extending socket in the perimeter surface 14 of the mold 10 adjacent the mold cavity 12 and opening laterally into the mold cavity 12. An upstanding boss 68 extends upwardly from the bottom locating surface 66. The socket 64 has the side locating surface 66 drafted upwardly and outwardly towards the adjacent outer edge 70 of the mold 10 and, similarly, the boss 68 has each of its opposite side surfaces 72 drafted to taper inwardly towards each other as they extend upwardly. These locating surfaces 66, 67 and 72 on the socket 64 correspond to similar locating surfaces provided on the insert 30. In this regard, the insert has a lower locating surface 77 corresponding to the bottom locating surface 66 and a drafted side locating surface 74 on the insert 30 corresponds to the side locating surface 67. A drafted locating recess 76 extends upwardly from the lower surface 77 and is adapted to closely engage upon and receive the upstanding boss 68. In this regard, the recess has its opposite side surfaces drafted to taper inwardly and upwardly towards each other. The side surfaces on the recess 76 correspond to the side surfaces of the boss 68. Thus, on the insert 30 being moved from the remote position to the engaged position, the corresponding locating surfaces of the socket 64 and the locating surfaces of the insert 30 engage each other and serve to cam and guide the insert 30 to locate in a desired predetermined position within the socket 64 on the mold 10. Providing the hinge pin 52 to have some freedom of movement relative to the hinge pin recess 62 on the mold 10 is one arrangement or assisting in permitting the insert 30 to accurately self-locate in the socket 64.

FIG. 5 shows that the upper surfaces of the hinge arm 50 and each of the lock bars 57 and 58 are flush with the perimeter surface 14. In the embodiment shown, with the insert 30 in the remote position, an upper surface 80 of the insert 30, an upper surface 81 of the hinge arm 50, upper surfaces 84 and 85 of the lock bars 57 and 58 are all flush with the perimeter surface 14 and other portions of the hinge mechanism including the screws are at least flush with or vertically below the perimeter surface 14. Thus, in the engaged position, the hinge mechanism and the insert 30 do not extend upwardly above the flat plane of the perimeter surface 14. With the hinge mechanism providing to be flush with or below the perimeter surface 14, the mechanical coupling 42 does not interfere with the normal manner of application of the vacuum bag 20 or the handling insertion or placement of the vacuum bag assembly 24 as, for example, within an autoclave.

The preferred embodiment of the invention illustrates an insert 30 adjacent an edge 36 of the mold cavity 12, however, this is not necessary and it is to be appreciated that an insert could be provided spaced inwardly from the cavity edge 36 as, for example, to provide an undercut surface engaged with the prepreg about the entire perimeter of the insert as could be accomplished, for example, by having an insert similar to the insert 30 mounted by a hinged mechanical coupling arrangement in which the length of the hinge arm 50 is increased so as, for example, to locate the insert 30 spaced from the cavity edge 36.

While the preferred embodiment shows a mold 10 with but one insert 30, it is appreciated that more than one insert could be provided with some or all of the inserts hinged and with different inserts, for example, interacting or overlapping and adapted for movement in a particular sequence relative to each other from the engaged position to the remote position.

In the preferred embodiment, a seal not shown is preferably provided between complementary surfaces of the insert 30 and the socket 64 so as to assist in maintaining a vacuum within the mold cavity 12 and constrain flow of resin. While not shown, a sealing member as in the nature of a gasket may be located between the mating surfaces of the socket 64 and the insert 30 to provide such a seal.

In the preferred embodiment, as best seen having regard to FIGS. 5 and 6, the lower surface 77 of the insert 30 is provided spaced from its locating recess 76 with two lateral recesses 86 and 87 and, as seen in FIG. 6, the socket 64 on the mold 10 has at each of its ends, openings 88 and 89 which extend downwardly from the perimeter surface 14 to below the recesses 86 and 87. After molding, the insert 30 frequently has its undercut insert molding surface 34 adhered to the resin of the resultant product. A pry bar not shown may be extended down through the openings 88 and 89 into the recesses 86 and 87 underneath the insert 30 and be manipulated to provide mechanical leverage to assist in breaking the adherence of the resin to the insert 30.

In the preferred embodiment, for ease of illustration, the sealing groove 16 in the perimeter surface 14 is shown to extend outwardly of the hinging mechanism. This is not necessary and, for example, the groove could extend through the hinge arm 50 and lock bars 57 and 58 provided suitable means are provided for sealing to maintain any vacuum. The groove could also extend over the upper surface 80 of the insert 30 again making provision for sealing to maintain a vacuum.

The preferred embodiment of the mechanism coupling the insert 30 to the mold 10 is adapted for manual movement of the insert 30 between the engaged position and the remote position and with the insert 30 to have an inherent tendency to remain in the engaged position when placed in the engaged position and an inherent tendency to remain in the remote position when placed in the remote position. Various arrangements may be provided to swing the insert between the engaged or remote positions. For example, manually operated or automated actuator mechanisms such as vertically operated pins or pistons could be provided to extend upwardly through the mold 10 to engage the insert 30 and/or the hinge arm 50 to move the insert 30 from the engaged position to the remote position or vice versa.

The preferred embodiment illustrates a hinge arrangement in which the relative movement of the hinge pin within a hinge pin recess permits for relative movement of the insert to the mold as can be advantageous for complementary nesting of the insert on the mold, however, this is not necessary and the cooperating engaging surfaces of the insert 30 and the mold 10 could be provided such that the hinge mechanism could provide for the insert to be fixedly hinged to the mold for rotation about a fixed hinge axis and with movement along an arcuate path about this fixed hinge axis being movement which brings the complementary locating surfaces of the insert and the mold into the preferred engaged position. Another mechanical linkage could include, for example, a hinge arrangement in which the hinge pin is fixed for rotation about a fixed pin axis, however, the hinge arm 50 has some inherent resiliency and flexibility to accommodate desired relative movement of the insert relative to the mold.

The preferred embodiment illustrates as a motion translating mechanism for moving the insert from the engaged position to a remote position a hinge type of mechanical coupling. The invention is not limited merely to use of a hinge type mechanical coupling and other mechanical linkages of the insert and mold are within the scope of the present invention. Another mechanical arrangement could comprise the hinge arm 50 being replaced by a helical coil spring which is fixed at one end to the insert 30 and at the other end to a recess within the mold such that by flexure of the helical spring, the insert may be moved from the engaged position to a remote position and with the weight of the insert biasing the insert to either be in the engaged position or when moved past a mid-point in the remote position. Compound linkages such as those used, for example, with automobile fuel doors could be substituted to provide for desired relative movement and locking of the insert relative to the mold in different positions.

While the invention has been described with reference to preferred embodiments, many modifications and variations will now occur to a person skilled in the art. For a definition of the invention, reference is made to the following claims.

We claim:

1. A method of vacuum bag lay up molding comprising:
providing a lay up mold with a movable insert which is mechanically coupled to the mold by a hinge mechanism for movement between (a) in an engaged position in which the insert is secured to the mold and provides an undercut surface, and (b) a remote position remote from the engaged position,
the mold having a perimeter surface in a flat plane for sealed engagement with a vacuum bag about a perimeter of the mold,
the mold having a mold cavity which extends downwardly into the mold from the perimeter surface,
the mold cavity having an upwardly directed cavity molding surface which intersects with the perimeter surface at a cavity edge,
the insert having an insert molding surface,
a downwardly extending socket in the perimeter surface of the mold adjacent the mold cavity opening laterally into the mold cavity,
the socket having upwardly directed locating surfaces complementary with locating surfaces on the insert for engagement to locate the insert in the socket in the engaged position with the insert molding surface directed downwardly into the mold cavity in opposition to the cavity molding surface to provide the undercut surface downwardly directed,
the hinge mechanism comprising a hinge coupling the insert to the mold for pivotal movement between the engaged position and the remote position,
the hinge mechanism comprising a hinge arm coupled at one end to the insert and extending in a first direction away from the insert to a distal end, a hinge pin at the distal end extending normal to the first direction,
a downwardly extending cut out portion in the perimeter surface of the mold defining a hinge pin recess,
the hinge pin received in the hinge pin recess against removal for relative pivoting of the insert relative the mold about the hinge pin,
the hinge mechanism pivots about the hinge pin to pivot the insert to the remote position in which the insert is spaced laterally outwardly from the cavity edge of the mold cavity,
the method including a cycle of operation with the sequential steps of:
(a) moving the insert to the engaged position, with the insert in the remote position laying sheet material into the lay up mold in engagement with the cavity molding surface, (b) with the insert in the remote position and the sheet material laid in the mold, moving the insert from the remote position to the engaged position by pivoting the insert about the hinge pin to place the undercut surface in engagement sheet material, (c) with the insert in the engaged position molding the sheet material in the mold to form the sheet material into a resultant product which is in engagement with the undercut surface, (d) after molding the sheet material, moving the insert relative the mold from the engaged position to the remote position by pivoting the insert about the hinge pin wherein in the remote position the insert is clear from the resultant product and the resultant product is capable of being removed from the mold without contacting the insert, and (e) with the insert in the remote position removing the resultant product from the mold.

2. A method as claimed in claim 1 wherein in the engaged position the hinge mechanism and the insert do not extend upwardly above the flat plane.

3. A method as claimed in claim 1 wherein in the engaged position the insert and the hinge mechanism are received within the socket and the cut out portion so as to not extend upwardly above the flat plane.

4. A method as claimed in claim 1 wherein when the insert is in the socket in the engaged position, the insert does not extend upwardly above the flat plane.

5. A method as claimed in claim 3 wherein the cut out portion is provided in the perimeter surface of the mold adjacent the socket and opens laterally into the socket, the cut out portion configured to receive the hinge mechanism including the hinge arm and the hinge pin within the cut out portion when the insert is in the socket in the engaged position with the hinge mechanism does not extend upwardly out of the cut out portion above the flat plane.

6. A method as claimed in claim 3 wherein the step (c) of molding includes:

while the insert is in the engaged position the steps of applying the vacuum bag over the mold cavity in sealed engagement with the perimeter surface about the perimeter of the mold and evacuating the vacuum bag to force the insert and the sheet material toward the mold.

7. A method as claimed in claim 6 including a step of heating the sheet material.

8. A method as claimed in claim 1 wherein the hinge pin is mounted in the hinge pin recess to provide for limited movement towards and away from the socket.

9. A method as claimed in claim 1 wherein the hinge mechanism coupling the insert to the mold for pivotal movement from the engaged position in which the insert is engaged with the socket toward the remote position in an arc initially pivoting the insert upwardly away from the mold cavity and laterally away from the mold cavity.

10. A method as claimed in claim 1 wherein the hinge mechanism coupling the insert to the mold for pivotal movement from the engaged position in which the insert is engaged with the socket toward the remote position in an arc initially moving the insert upwardly away from the mold cavity and laterally away from the mold cavity, and subsequently moving the insert downwardly toward the perimeter surface.

11. A method as claimed in claim 1 wherein the hinge mechanism coupling the insert to the mold for pivotal movement from the engaged position in which the insert is engaged with the socket toward the remote position in an arc initially moving the insert upwardly away from the mold cavity and laterally away from the mold cavity, and subsequently moving the insert downwardly toward the perimeter surface to the remote position in which the insert is spaced laterally from the mold cavity.

12. A method as claimed in claim 11 wherein the hinge mechanism moves the insert to the remote position in which the insert is spaced laterally from the mold cavity that the insert is clear from the resultant product and the resultant product is capable of being removed from the mold without contacting the insert.

13. A method as claimed in claim 7 wherein the hinge mechanism coupling the insert to the mold for pivotal movement from the engaged position in which the insert is engaged with the socket toward the remote position in an arc initially moving the insert upwardly away from the mold cavity and laterally away from the mold cavity, and subsequently moving the insert downwardly toward the perimeter surface to the remote position in which the insert is spaced laterally from the mold cavity.

14. A method as claimed in claim 13 wherein:

the hinge mechanism coupling the insert to the mold for pivotal movement from the remote position toward the engaged position in an arc moving the insert downwardly toward the mold cavity as the insert approaches the engaged position, the hinge pin is mounted in the hinge pin recess to provide freedom of motion sufficient that the engagement between the hinge pin and the hinge pin recess does not interfere with the upwardly directed locating surface of the socket engaging with the complementary with locating surfaces on the insert to locate the insert in the socket in the engaged position.

15. A method as claimed in claim 1 wherein:

the hinge mechanism coupling the insert to the mold for pivotal movement from the remote position toward the engaged position in an arc moving the insert downwardly toward the mold cavity as the insert approaches the engaged position, the hinge pin is mounted in the hinge pin recess to provide freedom of motion sufficient that the engagement between the hinge pin and the hinge pin recess does not interfere with the upwardly directed locating surface of the socket engaging with the complementary with locating surfaces on the insert to locate the insert in the socket in the engaged position.

16. A method as claimed in claim 1 wherein when in the remote position the insert has an inherent bias to remain in the remote position against movement toward the engaged position.

17. A method as claimed in claim 1 wherein when in the engaged position the insert has an inherent bias to remain in the engaged position against movement toward the engaged position.

18. A method as claimed in claim 16 wherein when in the engaged position the insert has an inherent bias to remain in the engaged position against movement to the engaged position.

19. A method as claimed in claim 1 wherein the insert is manually moved between the engaged position and the remote position.

20. A method as claimed in claim 1 wherein the insert is manually moved between the engaged position and the remote position, the hinge coupling the insert to the mold for pivotal movement from the remote position toward the engaged position in an arc moving the insert downwardly toward the mold cavity as the insert approaches the engaged position, the hinge coupling the insert to the mold for pivotal movement from the engaged position in which the insert is engaged with the socket toward the remote position in an arc initially moving the insert upwardly away from the mold cavity and laterally away from the mold cavity, and subsequently moving the insert downwardly toward the perimeter surface to the remote position in which the insert is spaced laterally from the mold cavity, the hinge pin is mounted in the hinge pin recess to provide freedom of motion sufficient that the engagement between the hinge pin and the hinge pin recess does not interfere with the upwardly directed locating surface of the socket engaging with the complementary with locating surfaces on the insert to locate the insert in the socket in the engaged position, when in the remote position, the insert has an inherent bias to remain in the remote position against movement toward the engaged position, when in the engaged position, the insert has an inherent bias to remain in the engaged position against movement toward the engaged position.

\* \* \* \* \*